UNITED STATES PATENT OFFICE.

RUDOLF SCHÜLE, OF FRANKFORT-ON-THE-MAIN, GERMANY.

RED AZO DYE AND PROCESS OF MAKING SAME.

No. 873,798.  Specification of Letters Patent.  Patented Dec. 17, 1907.

Application filed October 6, 1906. Serial No. 337,831.

*To all whom it may concern:*

Be it known that I, RUDOLF SCHÜLE, doctor of philosophy, a citizen of Prussia, and a resident of Frankfort-on-the-Main, in the Province of Hesse-Nassau and Kingdom of Prussia, Germany, have invented certain new and useful Improvements in Red Azo Dye and Processes of Making Same, of which the following is a specification.

I have discovered that valuable direct colors, dyeing cotton yellow-red to claret-red shades, are obtained if the monoazo dyestuffs resulting from diazo bodies and the product of condensation of m-amidobenzaldehydebisulfite and 1.2.-diamido-5-oxynaphthalene-7-sulfoacid are diazotized and combined with naphtholsulfonicacids. This process may also be reversed, viz: by first diazotizing the product of condensation mentioned, then combining with naphtholsulfonic acids, and finally coupling with diazo bodies. The resulting coloring matters are probably of the following constitution:—

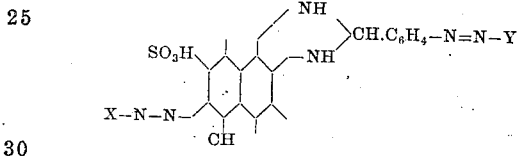

They are derivatives of a phenyldihydronaphthimidazol.

The process is illustrated by the following example: 12.1 kilos m-amidobenzaldehyde are dissolved in water by heating with about the theoretical quantity of sodium bisulfite, the solution then being mixed with a solution of 25.4 kilos 1.2-diamido-5-naphthol-7-sulfonicacid. It is then brought to boiling and kept at boiling temperature for about an hour. The mixture is then acidulated with hydrochloric acid, and the sparingly soluble precipitate which has been formed is filtered off and washed. The precipitate is then dissolved by the addition of carbonate of soda, the solution is made alkaline, and cooled; thereupon the diazo solution of 9.3 kilos anilin, produced in the usual manner, is allowed to run in. The sparingly soluble coloring matter is filtered off, mixed up with water, and then 50 kilos hydrochloric acid of 21° Bé. are added at 0° C. 7.1 kilos nitrite are then gradually introduced, and the whole is left standing for some time at 0° C. The diazo compound is then introduced into the cold solution of 25 kilos 2.6-naphtholsulfonicacid, kept alkaline with soda; the dyestuff is formed immediately. The diazo dyestuff thus obtained is rather easily soluble in water and can be completely precipitated from the aqueous solution by common salt. It dyes unmordanted cotton scarlet red shades. These dyeings possess a good fastness to washing and light, and especially a prominent resistance to acids.

Example II. The product obtained by condensing 12.1 kilos m-amido benzaldehyde bisulfite and 25.4 kilos 1.2. diamido-5-oxynaphthalene-7-sulfoacid is dissolved in water by means of 11.5 kilos caustic soda lye (40° Bé.); 7-1 kilos nitrite of sodium are added, and the solution is allowed to run into 30 kilos hydrochloric acid diluted with water and cooled with ice. The diazo compound thus obtained is introduced into the alkaline solution of 25 kilos 2.6. naphtholsulfoacid. As soon as the formation of the monoazo dyestuff is completed, a solution of 9.3 kilos diazotized anilin is added. The diazo dyestuff thus produced is identical with that described in the first example.

If the anilin is replaced by its homologues, halogen-derivatives, alkyloxy-derivatives, etc., more bluish shades result. Analogous coloring matters are also obtained if other alpha or betanaphthol-mono- or disulfoacids are substituted for the 2.6-naphtholsulfoacid.

Having now particularly described and ascertained the nature of my said invention and in what manner the same is to be performed, I declare that what I claim is:

1. The herein described improvement in the manufacture of dyestuffs which consists in combining the product of condensation of m. amidobenzaldehyde bisulfite and 1.2. diamido 5. oxynaphthalene 7. sulfoacid with a diazo compound and a naphthol sulfoacid.

2. The coloring matter obtained by combining a diazo-compound of a primary aromatic amin with the product of condensation of 1.2. diamido-5-oxynaphthalene-7-sulfonic acid and m. amidobenzaldehyde bisulfite, further diazotizing the monoazodyes and combining with a naphtholsulfoacid; which in a dry state forms a brown powder, dissolving in concentrated sulfuric acid with a claret-red color and dyeing unmordanted cotton in red shades fast to washing and acids, substantially as described.

Signed at Frankfort-on-the-Main in the Province of Hesse-Nassau and Kingdom of Prussia, Germany, this 15th day of September, A. D. 1906.

RUDOLF SCHÜLE.

Witnesses:
  JEAN GRUND,
  CARL GRUND.